J. P. CORMODE.
EVENER.
APPLICATION FILED JUNE 23, 1910.
1,038,725.
Patented Sept. 17, 1912.
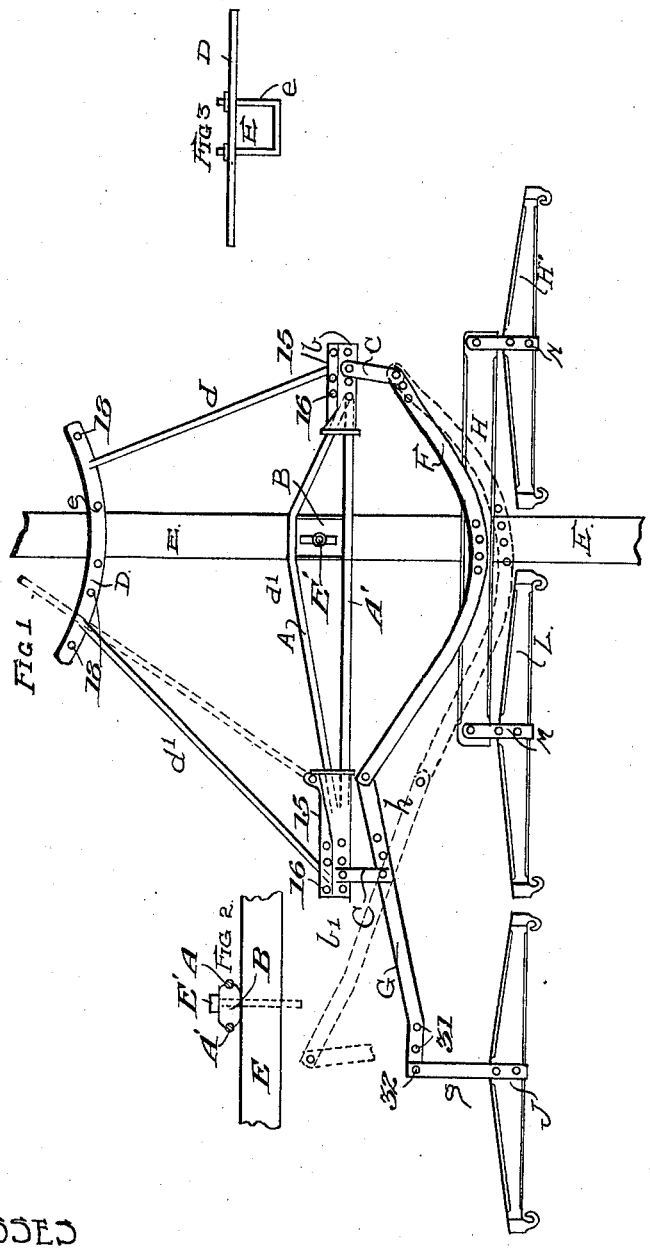
WITNESSES
INVENTOR

UNITED STATES PATENT OFFICE.

JOHN PAULUCCI CORMODE, OF CHATHAM TOWNSHIP, KENT COUNTY, ONTARIO, CANADA.

EVENER.

1,038,725.   Specification of Letters Patent.   Patented Sept. 17, 1912.

Application filed June 23, 1910. Serial No. 568,481.

*To all whom it may concern:*

Be it known that I, JOHN PAULUCCI CORMODE, a subject of the King of Great Britain, residing in the township of Chatham, in the county of Kent, in the Province of Ontario, Canada, have invented certain new and useful Improvements in Eveners, of which the following is a specification.

My invention relates to improvements in eveners and particularly in three horse eveners, in which a double tree and a swingle tree, operate in conjunction with a set of levers that are attached to a trussed draw beam, operating independently on top of the pole or tongue.

The objects of my improvements are: first to provide a device so that each horse will do its own proportion of the work, with side draft reduced to a minimum; secondly, to provide a device which affords an easy means of regulating and equalizing the pulling stress to each horse.

With the above and other objects in view, the invention consists in the novel construction, combination and arrangement of parts as will be hereinafter more particularly described, and then claimed, and in describing the invention in detail, reference will be had to the accompanying drawings, in which:

Figure 1 is a plan view of the entire device attached to a section of an ordinary binder pole. Fig. 2 is a sectional view through the truss bar, the securing block for said bar and a part of the pole being shown in side elevation, and Fig. 3 is a view of the draw bar showing the clip for securing the same to the pole.

The truss member may be made of any desirable material, and of any desired form, but is preferably made, as herein shown, of two metal members, the truss bar being designated as A, the truss bar being of a form which will bring its ends parallel with the ends of the principal bar A', to which they are secured. This truss member embodying the two bars as shown is secured to the pole E by means of a clip B bolted to the pole E as at E' and receiving in its recessed ends the rods A, A' constituting the truss member.

The truss member carries at its ends the sleeves or clips —b—, —b'—, the rearwardly extending flanges 15 of which are provided with a plurality of apertures 16 in one aperture of each slip or sleeve of which is engaged the forward ends of draw rods d, d', the rear ends of said rods being detachably engaged in one or the other of apertures 18 provided in a substantially-segment-shaped draw bar D secured to the tongue or pole E as by a clip or clevis —e—.

An evener lever F is provided, preferably formed of two spaced similar members, curved or bent into somewhat of a V-shaped form, and which at the bow thereof receive between them the double tree H. The arms of this evener lever F are of unequal length, the shorter arms being adjustably connected by a link or straps C, with the clip or sleeve at one end of the truss bar, and the longer arm of said evener lever F is pivotally-connected to one end of an auxiliary evener lever G. Adjustable connection is provided between the clip or sleeve b' on one end of the truss bar and the lever G by a strap or link C similar to the strap or link C connecting the shorter arm of lever F to the sleeve B.

The auxiliary lever G is provided adjacent its outer end with a plurality of apertures 31, any one of which is adapted to receive the pivot 32 of a link or clevis —g—, which carries a swingletree J. Swingletrees L and H' are connected by the usual straps or clevises M and N to the respective ends of the double tree H. The double tree H and the evener lever F operate on top of the pole E.

In Fig. 1 the evener is shown in full lines as adapted for three horses, and in dotted line position the evener lever F, auxiliary evener lever G and draw rod d' are so shown in the position of such parts when the device is adapted for two horses. To adapt the device for use as a four horse evener, will require that the truss member be slightly longer, together with the draw rods d, d', than is required for a three horse evener.

The entire device lies upon and operates on the upper side of the tongue or pole, the truss bar and the double trees and swingle trees operating independently of the tongue.

Having fully described my invention, what I claim as new and desire to secure by Letters Patent is:—

In an evener, a truss bar secured to a tongue and having a long and a short arm on respective sides of the tongue, an evener lever comprising two similar members, a double tree carried between the members, said evener bar having a long and a short arm, the shorter arm connected to the shorter arm of the truss bar, an auxiliary evener lever connected to the longer arm of the truss bar, the shorter arm of said auxiliary evener lever connected with the longer arm of the first-mentioned evener lever, a swingle tree carried by the longer arm of said auxiliary evener lever, and swingle trees carried by said double tree.

JOHN PAULUCCI CORMODE.

Witnesses:
BELLE McCOMBS,
ETHEL M. CONLON.

Copies of this patent may be obtained for five cents each, by addressing the "Commissioner of Patents, Washington, D. C."